(12) United States Patent
Quentin (10) Patent No.: US 12,107,975 B2
(45) Date of Patent: Oct. 1, 2024

(54) METHOD FOR PROCESSING A TRANSACTION, CORRESPONDING DEVICE, SYSTEM AND PROGRAM

(71) Applicant: Banks and Acquirers International Holding, Paris (FR)

(72) Inventor: Pierre Quentin, Enghien les Bains (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 685 days.

(21) Appl. No.: 17/279,287

(22) PCT Filed: Sep. 25, 2019

(86) PCT No.: PCT/EP2019/075953
§ 371 (c)(1),
(2) Date: Mar. 24, 2021

(87) PCT Pub. No.: WO2020/064890
PCT Pub. Date: Apr. 2, 2020

(65) Prior Publication Data
US 2021/0406866 A1    Dec. 30, 2021

(30) Foreign Application Priority Data
Sep. 25, 2018   (FR) ..................... 1858754

(51) Int. Cl.
*H04L 29/06* (2006.01)
*G06Q 20/38* (2012.01)
(Continued)

(52) U.S. Cl.
CPC ........... *H04L 9/50* (2022.05); *G06Q 20/3827* (2013.01); *H04L 9/3239* (2013.01); *H04L 9/3247* (2013.01)

(58) Field of Classification Search
None
See application file for complete search history.

(56) References Cited

U.S. PATENT DOCUMENTS

2017/0132621 A1* 5/2017 Miller .................. H04L 9/0861
2018/0063709 A1* 3/2018 Morrison ............ H04W 12/069

FOREIGN PATENT DOCUMENTS

| WO | 2012053780 A  | 4/2012 |
| WO | 2018026727 A1 | 2/2018 |

OTHER PUBLICATIONS

International Preliminary Report on Patentability and English translation of the International Written Opinion dated Mar. 23, 2021 for corresponding International Application No. PCT/EP2019/075953, filed Sep. 25, 2019.
(Continued)

*Primary Examiner* — Andrew J Steinle
(74) *Attorney, Agent, or Firm* — David D. Brush; Westman, Champlin & Koehler, P.A.

(57) ABSTRACT

A method for processing a transaction, wherein the method is implemented by an electronic device for processing transactions, accessible via a communication network. The includes a transaction processing phase. The transaction processing phase: obtaining a contextual cryptographic fingerprint, previously generated during an authentication of a user on a communication terminal; verifying validity of the contextual cryptographic fingerprint in a blockchain including a set of cryptographic fingerprints; and validating a transaction when the verifying the validity of the contextual cryptographic fingerprint in a blockchain is positive.

10 Claims, 4 Drawing Sheets

(51) Int. Cl.
  *H04L 9/00* (2022.01)
  *H04L 9/32* (2006.01)

(56) References Cited

OTHER PUBLICATIONS

International Search Report and Written Opinion dated Oct. 14, 2019 for corresponding International Application No. PCT/EP2019/075953, filed Sep. 25, 2019.
French Search Report and Written Opinion dated Aug. 8, 2019 for corresponding French Application No. 1858754, filed Sep. 25, 2018.

* cited by examiner

METHOD FOR PROCESSING A TRANSACTION, CORRESPONDING DEVICE, SYSTEM AND PROGRAM

CROSS-REFERENCE TO RELATED APPLICATIONS

This application is a Section 371 National Stage Application of International Application No. PCT/EP2019/075953, filed Sep. 25, 2019, the content of which is incorporated herein by reference in its entirety, and published as WO 2020/064890 on Apr. 2, 2020, not in English.

1. FIELD

The invention relates to the field of authenticating users. The invention relates more particularly to the authentication of users during transactions involving the implementation of a user device, also called communication terminal. The invention relates more particularly to the authentication of a user in a distributed database in a communication network. Even more specifically, one object of the present technique is to increase the level of security of a transmission of data in the context of the processing of a transaction (such as a mobile payment) carried out with a portable communication terminal (for example a smartphone or a tablet).

2. PRIOR ART

In general, the number of online payments is constantly increasing. Mobile payments represent a particular type of online payments and an increasing share of the latter. They can be carried out via payment providers, such as PayPal™, or by making use of conventional banking organisations, by using a payment bank card.

However, online payment is marked by a relatively high rate of fraud. In France, it is estimated that approximately 5% of the online payments carried out over the Internet are fraudulent. These 5% fraudulent payments represent approximately thirty-three percent of the total cost of fraud. It is therefore necessary to have means on the one hand to identify the attempts at fraud and on the other hand to block these attempts.

One of the problems in transactions by mobile telephone is that they are carried out in "card not present" mode (CNP). In this mode, since no device is tasked with verifying the integrity of the card (for example such as a payment terminal), it is not possible to verify that the holder of the card has the PIN code necessary to validate a transaction: the payment card is not used to carry out the transaction. Only the data inscribed on the card is. This data can be stolen to carry out transactions by fraudsters, optionally by using other merchant applications, in the context of other mobile payments. Also, the communication terminal of the user (which comprises all the data of the payment cards used by said user) can also be stolen, giving the thief access to all of the data of the user and allowing the thief to carry out fraudulent transactions.

Thus, with the goal of securing the transactions carried out in CNP mode, systems and methods have been proposed to solve these fraud problems. These methods pose problems of convenience for the user or other security problems. This is for example the method described in the patent document WO2012053780. In this document, a verification system and method are described. More particularly a method and a system using information on the MAC address of a client terminal are described. During a transaction involving a payment, an authentication process is implemented in which the MAC address of the terminal used by the user wishing to carry out a payment is compared to a reference MAC address, defined or obtained by the bank server, which server must authorise a payment or a transaction.

This method, although potentially of interest, is nevertheless not very practical. Indeed, on the one hand, this method forces the user to always use the same device to carry out a payment (unless several devices authorised to carry out a transaction are defined). On the other hand, there are numerous methods for falsifying a MAC address of a peripheral.

Other methods are also available. Some involve providing the user with unique bank card numbers. These numbers are provided according to the needs of the client. This method is of interest but does not eliminate the possibility for the user to use their own card information to carry out transactions. Other methods, currently widely used, involve transmitting a message of the SMS type to the client who carries out a transaction to ensure that they are the card holder. The user must enter, at the moment of the transaction, a password transmitted in the SMS. Consequently, the bank makes sure with a reasonable probability that the person carrying out the transaction is the user. This method has two disadvantages: on the one hand, it requires the user to provide their telephone number to the bank before any transaction and in a secure manner; on the other hand, and especially, this method only works if the bank of the client is also the bank that manages the transaction for the account of the merchant, which is not necessarily the case, especially abroad, precisely where most of the fraud is carried out. Thus, the aforementioned method is not very effective in this case.

3. SUMMARY

The method proposed by the inventors does not pose these problems of the prior art. Indeed, a method for securing the transaction based on the recording, in a distributed database, of the authentications of the user on their communication terminal is proposed. More particularly, the present technique delivers, in a distributed database, authentications of users on their communication terminal, these authentications being then used to validate a transaction carried out by the user.

More particularly, a method for processing a transaction is described, which method is implemented by an electronic device for processing transactions, accessible via a communication network. According to the invention, such a processing method comprises a transaction-processing phase characterised in that it comprises:

- a step of obtaining a contextual cryptographic fingerprint, previously generated during an authentication of a user on a communication terminal;
- a step of verifying the validity of the contextual cryptographic fingerprint in a blockchain comprising a set of cryptographic fingerprints;
- a step of validating a transaction when the step of verifying the validity of the contextual cryptographic fingerprint in a blockchain is positive.

Thus, according to the invention, the issues of the prior art are at least partly resolved while ensuring that a transaction, for example a mobile payment transaction, can be validated via a successful authentication of the user on their communication terminal and the validation (and non-rejection) of this authentication in a blockchain.

According to a particular feature, a contextual cryptographic fingerprint (EC) is embodied by an identification string ChIEC for identification of the cryptographic fingerprint EC which is obtained on the basis of a set D of constituent data (d0, . . . , dn) in the following manner:

$$ChIEC = F(G(d0, \ldots, dn))$$

wherein:

G is a data-mixing function;

F is a cryptographic function for calculating the identification string.

Thus, it is ensured that a contextual cryptographic fingerprint (EC) is not reproducible within the blockchain, and that it is unique, at a given time, for a set of constituent data.

According to a specific embodiment, the step of obtaining the contextual cryptographic fingerprint comprises:

a step of receiving an address of location of the contextual cryptographic fingerprint in the blockchain;

a step of obtaining the contextual cryptographic fingerprint at the address previously received. Thus, the contextual cryptographic fingerprint cannot be falsified.

According to a particular feature, the step of verifying the validity of the contextual cryptographic fingerprint comprises a step of verifying the validity of the block of the blockchain into which the contextual cryptographic fingerprint is inserted.

Thus, it is ensured that the contextual cryptographic fingerprint is valid with respect to the block itself.

According to a particular feature, the step of verifying the validity of the contextual cryptographic fingerprint comprises a step of determining that the contextual cryptographic fingerprint is the latest contextual cryptographic fingerprint for said user and/or for said communication terminal in the blockchain.

Thus, it is ensured that only the last contextual cryptographic fingerprint available can be used for a transaction validation: the problems of replays are thus solved.

According to a particular feature, the step of verifying the validity of the contextual cryptographic fingerprint comprises:

a step of obtaining transaction data, coming from the communication terminal;

a step of calculating, on the basis of this transaction data, a verification cryptographic fingerprint;

a step of comparing the verification cryptographic fingerprint to the contextual cryptographic fingerprint; and a step of validating the contextual cryptographic fingerprint when the comparison is positive.

Thus, the additional possibility of verifying the contextual cryptographic fingerprint with respect to the data that constitutes it is provided.

According to a specific embodiment, the step of verifying the validity of the contextual cryptographic fingerprint comprises a step of comparing at least one piece of data for constituting the contextual cryptographic fingerprint to at least one corresponding piece of data provided by the communication terminal.

According to a specific embodiment, the method for processing a transaction further comprises a preliminary authentication phase, during which the contextual cryptographic fingerprint is created, said preliminary authentication phase comprising:

a step of authenticating the user;

a step of obtaining an authentication message, comprising the confirmation of the authentication of the user and a set D of constituent data (d0, . . . , dn);

a step of calculating the contextual cryptographic fingerprint using the data received. According to a specific embodiment, the preliminary authentication phase further comprises:

a step of inserting the contextual cryptographic fingerprint into the blockchain; and when the block of the blockchain into which the contextual cryptographic fingerprint has been inserted is validated, a step of transmitting the contextual cryptographic fingerprint to the communication terminal.

According to another aspect, the invention also relates to an electronic device for processing transactions, accessible via a communication network, said device comprising means for processing a transaction. Such a device comprises:

means for obtaining a contextual cryptographic fingerprint, previously generated during an authentication of a user on a communication terminal;

means for verifying the validity of the contextual cryptographic fingerprint in a blockchain comprising a set of cryptographic fingerprints;

means for validating a transaction implemented when the means for verifying the validity of the contextual cryptographic fingerprint in a blockchain provide a positive piece of information.

It is understood, in the context of the description of the present technique according to the invention, that a step of transmitting a piece of information and/or a message from a first device to a second device at least partly corresponds for this second device to a step of receiving the piece of information and/or the message transmitted, whether this reception and this transmission are direct or carried out via other transport, gateway or intermediation devices, including the devices described here according to the invention.

According to a preferred implementation, the various steps of the methods according to the invention are implemented by one or more pieces of software or computer programs, comprising software instructions intended to be executed by a data processor of a relay module according to the invention and designed to control the execution of the various steps of the methods, implemented in the communication terminal, the authentication server and the merchant server.

Consequently, the invention is also aimed at programs, capable of being executed by a computer or by a data processor, these programs including instructions for commanding the execution of the steps of the methods as mentioned above.

A program can use any programming language, and be in the form of source code, object code, or intermediate code between source code and object code, such as in a partly compiled form, or in any other desired form.

The invention is also aimed at an information support readable by a data processor, and including instructions of a program as mentioned above.

The information support can be any unit or device capable of storing the program. For example, the support can include a storage medium, such as a ROM, for example a CD-ROM or a ROM of a microelectronic circuit, or a magnetic recording medium, for example a mobile support (memory card) or a hard disk or an SSD.

Moreover, the information support can be a transmittable support such as an electric or optical signal, which can be transported via an electric or optical cable, by radio or by other means. The program according to the invention can be in particular downloaded on a network of the Internet type.

Alternatively, the information support can be an integrated circuit into which the program is incorporated, the circuit being adapted to execute or to be used in the execution of the method in question.

According to one embodiment, the invention is implemented via software and/or hardware components. In this respect, the terminal "module" can correspond in this document to both a software component and a hardware component or a set of software and hardware components.

A software component corresponds to one or more computer programs, one or more subprograms of a program, or more generally to any element of a program or of a piece of software capable of implementing a function or a set of functions, according to that which is described below for the module in question. Such a software component is executed by a data processor of a hardware unit (terminal, server, gateway, set-top-box, router, etc.) and is capable of accessing the hardware resources of this hardware unit (memories, recording supports, communication buses, input/output electronic cards, user interfaces, etc.).

Likewise, a hardware component corresponds to any element of a hardware assembly capable of implementing a function or a set of functions, according to that which is described below for the module in question. This can be a hardware component that is programmable or has an integrated processor for the execution of software, for example an integrated circuit, a chip card, a memory card, an electronic card for the execution of firmware, etc.

Each component of the system described above of course implements its own software modules.

The various embodiments mentioned above can be combined with each other for the implementation of the invention.

4. DRAWINGS

Other features and advantages of the invention will be clearer upon reading the following description of a preferred embodiment, given as a simple illustrative and non-limiting example, and the appended drawings, in which.

5. DESCRIPTION 5.1. Reminders of the Principle

It was explained above that the implementation of a payment transaction in "card not present" mode increases the risk of fraud. The object of the present technique is to overcome, at least partly, certain disadvantages of the transactions in "card not present" mode by introducing a mechanism for verifying identity, allowing to provide the merchant (possessor of an online sales service, via a—set of—merchant server(s)) with a confirmation (with a reasonable certainty) of the identity of the user (and of their legitimacy to carry out the purchase and the resulting payment transaction). In the context of the present technique, a blockchain is implemented, the blockchain recording characteristics of successive authentications of users (these characteristics being called contextual cryptographic fingerprints).

Figure 1:
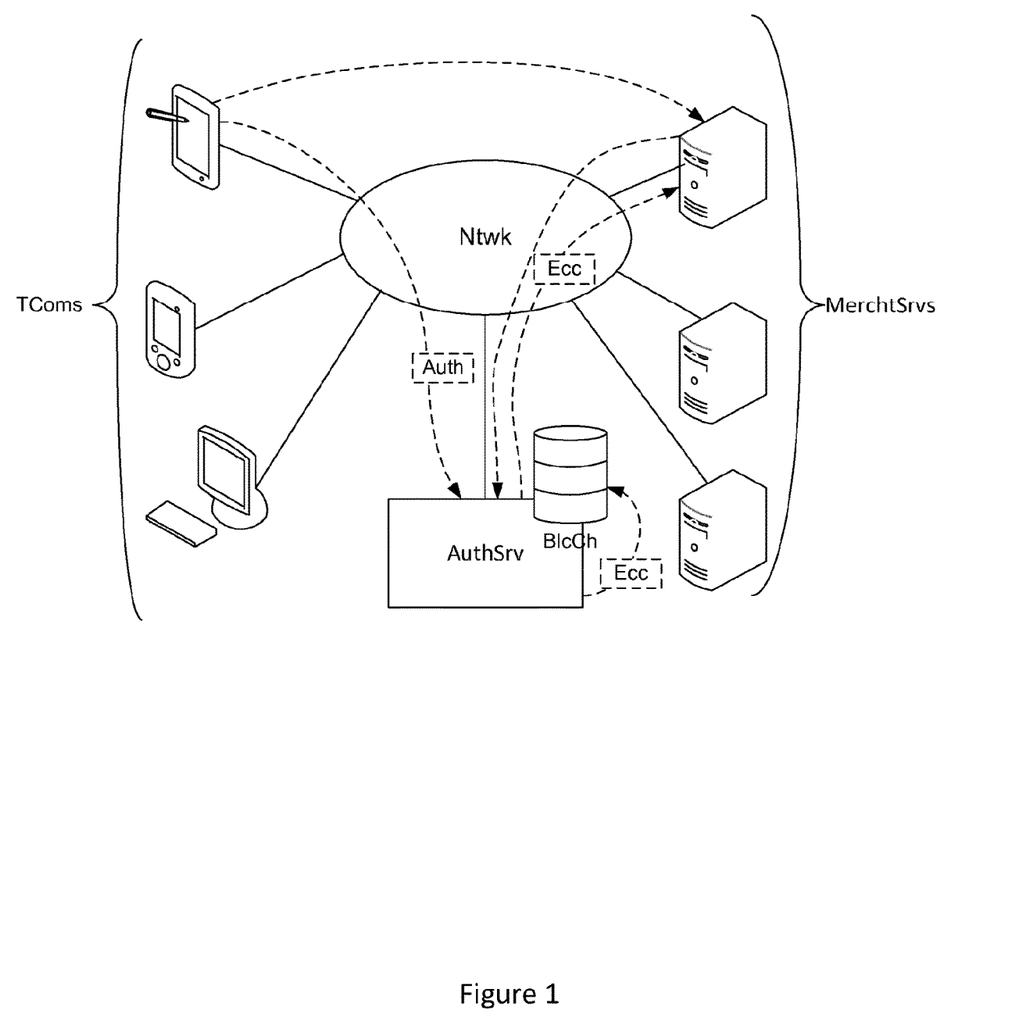
FIG. 1 describes a system in which the invention is implemented.

In one embodiment, described in relation to FIG. 1, the technique is implemented in a system comprising several different units, cooperating and each one of them implementing an adapted method. More particularly, the system comprises:

- an authentication server (AuthSrv), implementing a blockchain, in which proofs of authentication of the users are recorded, in a blockchain (BlcCh);
- a set of communication terminals (TComs), each terminal being owned by a user who uses their communication terminal to carry out purchases and/or carry out transactions;
- a set of merchant servers (MerchtSrvs), owned and implemented by one or more online providers of goods and/or services accessible via the communication terminals.

These servers and terminals exchange data via one or more communication networks (Ntwk) to which they are connected.

The general principle of the technique involves transmitting, to the merchant server, a contextual cryptographic fingerprint (Ecc), representative of an authentication (auth) of a user on their communication terminal, and this contextual cryptographic fingerprint (Ecc) can be verified by the authentication server before validation of the payment transaction by the merchant server and/or a transaction server (bank server, server of the issuer of the payment data). In a first embodiment, the authentication server is capable of validating the contextual cryptographic fingerprint transmitted by the (or on behalf of the) communication terminal of the merchant server, via the blockchain (BlcCh) that it implements. In a second embodiment, the authentication server is capable of calculating the contextual cryptographic fingerprint of the communication terminal, then transmitting it to the merchant server, again via the blockchain (BlcCh) that it implements. There is therefore a certain guarantee of the authentication of the user when the transaction is validated, which allows to significantly reduce the rate of fraud of the payment means.

According to the present technique, in one embodiment, a cryptographic fingerprint comes from a data structure that comprises:

- constituent data: data relative to the authentication like a timestamp, an emitter (for example identifier of a communication terminal), a receiver (for example identifier of an authentication service);
- optionally a number of blocks having confirmed the cryptographic fingerprint provided (number of validation blocks);
- and optionally other contextual information: IP address, geographic position, previous cryptographic fingerprint (of the user), etc.

The fingerprint per se is an identification string (identifier of the cryptographic fingerprint), resulting from a calculation carried out on the previously listed data for constituting the cryptographic fingerprint. This cryptographic fingerprint (identification string) can, once this calculation has been carried out, be integrated into the data structure described above. This data structure can, according to the case, be preserved by the authentication server in a database specifically dedicated to this purpose, be integrated into the blockchain, or be deleted, if it is not necessary to have access to this data.

A reference cryptographic fingerprint (the implementation of which is described below) can also comprise (and/or come from) data relative to the authentication of the user (biometric signatures, identifier signature, password signature, etc.). A contextual cryptographic fingerprint can comprise (and/or come from) a reference (for example in the form of an identification string) to a previous cryptographic fingerprint.

Let D be the set of constituent (initiating) data (d0, ..., dn) of the cryptographic fingerprint EC. F is the cryptographic function for calculating the identification string ChIEC which is considered to be the cryptographic fingerprint EC. G is a data-mixing function. The string ChIEC for identifying the cryptographic fingerprint EC is calculated in the following manner:

$$ChIEC = F(G(d0, \ldots, dn))$$

The calculation function F and the mixing function G are not specifically described in detail and depend on the conditions of operational implementation of the blockchain in the authentication servers. The function G is a data-mixing function of the type concatenation, hexadecimal addition, multiplication, modulo decimal, modulo hexadecimal or modulo binary, rotation (decimal, hexadecimal, binary), etc. function. The function F can for example be a function (for example the MD5 function or the SHA1 function) for hashing the result of the function G. The hash fingerprint (or hash value) obtained thus forms a cryptographic digest representative of the constituent data, without it being possible to find this constituent data on the basis of this hash fingerprint. Below and above, the term "cryptographic fingerprint" (EC) is mainly used to refer to the identification string of the latter (i.e. to the identifier of the cryptographic fingerprint ChIEC), which allows to identify this cryptographic fingerprint in the blockchain.

In general, the technique proposed is based on several phases of creation and processing of authentication data.

In a first phase of subscription, a user has carried out the procedures necessary for their online subscription to a service, which service can manage the authentication of the user. For example, this subscription can take place when the user activates their communication terminal for the first time. In this subscription phase, the user provides, to the unit acting as an authentication server, the data necessary for the subscription (last name, first name) and for the future authentication (password and/or fingerprint and/or iris and/or other biometric or other data).

The authentication server stores these elements in a secure manner. Moreover, according to the present technique, the authentication server can calculate, on the basis of these elements, a reference cryptographic fingerprint. This reference cryptographic fingerprint, calculated by the authentication server (according to modes identical to those presented above), can be inserted into a blockchain (and transmitted in return to the communication terminal which records it in a secure memory space). This is normally the same blockchain as that which is used to globalise the successive authentications of the users with respect to the authentication server (or the authentication server farm). As explained above, the blockchain is not, normally, a public blockchain, but rather a private blockchain, reserved for the use of the authentication server (or of the set of authentication servers) and optionally of certain merchant servers (online sales servers) having access to this blockchain. The condition of sharing this blockchain with merchant servers will be explained below, in the context of a specific embodiment of the invention. Alternatively, the reference cryptographic fingerprint can be calculated by the communication terminal itself and transmitted to the authentication server (optionally with the constituent data of said fingerprint).

Regardless, after this phase of subscription the authentication server(s) have the elements necessary for the authentication of the user. When the user starts up or uses their mobile terminal, they carry out an action of authentication with respect to the authentication server. This authentication action is either explicit (an authentication service explicitly requires the authentication of the user on their terminal) or implicit (during the use or the starting of the terminal, an authentication with the service was carried out, for example during the unlocking of the communication terminal or during a default connection to a given service, via the communication terminal, for example electronic messaging service, centralised authentication service). More particularly an implicit authentication is for example carried out upon the starting of the communication terminal when the user enters a password or provides biometric data: the authentication server, via a message that it receives from the communication terminal, is informed of the fact that the user has been correctly authenticated on the communication terminal. Other explicit or implicit authentication modes can also be implemented: this involves confirming or informing the server that the authentication on the communication terminal or with an online service has correctly taken place.

According to the present technique, these methods have in common the fact that the communication terminal carries out an authentication of the user, locally or in cooperation with the authentication server(s), with respect to a certain number of pieces of data (and/or of characteristics) authenticated. More particularly, the terminal and/or the server compares the data (and/or characteristics) provided by the user to reference data. The reference data is obtained during the subscription phase (see above) and stored in a secure memory (on the communication terminal and/or on the authentication server). During the implicit or explicit authentication, the fact that a valid authentication has been carried out is recorded on the authentication server, after the reception of a message by the authentication server.

The message received by the authentication server contains on the one hand data on validation of the authentication (for example hash of the password or signature of the fingerprint or iris, or even a cryptographic fingerprint) that is accompanied or associated with contextual data (for example the date, the time of the authentication, an optional identification of the communication terminal, serial number, IMEI, etc. and/or other relevant contextual data). This data is used, by the authentication server, to calculate a "contextual" cryptographic fingerprint, as explained above. This contextual cryptographic fingerprint (potentially different from the reference cryptographic fingerprint) is inserted into the blockchain (and is optionally linked to a previous cryptographic fingerprint of the user). The contextual cryptographic fingerprint (or a reference to the contextual cryptographic fingerprint, for example a URL) is then returned to the communication terminal, which stores it in a secure memory (for example in the same memory slot as the reference cryptographic fingerprint).

Alternatively a link or a reference to the contextual cryptographic fingerprint can be transmitted to the communication terminal. This contextual cryptographic fingerprint constitutes the proof of the successful authentication of the communication terminal. The reception of this proof by the communication terminal (the fact that this contextual cryptographic fingerprint is recorded on the communication terminal, or the fact that there is a link or a reference to this contextual cryptographic fingerprint), validates the fact (the state) of having been correctly authenticated by the authentication server and validates the state of the recording of this authentication in the blockchain.

More particularly, according to the embodiments, the contextual cryptographic fingerprint is only transmitted to the communication terminal when the current block of the blockchain (in which the contextual cryptographic fingerprint is recorded) is validated (i.e. complete and that the closing of this current block is cryptographically validated and verified), and a new block (at least) is created in the blockchain. More particularly, in these implementations, the contextual cryptographic fingerprint is only delivered to the communication terminal when it is ensured that said fingerprint is no longer modifiable in the blockchain. This absence of a possibility of modification is only provided, from the point of view of the blockchain, when the current block is complete and validated, and a new block is "opened" to record the following authentications (and/or subscriptions). In other words, the transmission, to the communication terminal, of the contextual cryptographic fingerprint (or of a link or of a reference to the latter) is not immediate and depends substantially on the time it takes for the system in its entirety to close the current block of the blockchain (relatively short time after all, if compared to the number of authentications carried out every day).

Once the contextual cryptographic fingerprint (or its link or its reference) is received by the communication terminal, said fingerprint can be used in the context of the implementation of transactions between the communication terminal and one or more providers of goods and/or services with which the user (of the communication terminal) wishes to carry out transactions.

More particularly, during the implementation of a transaction from the communication terminal (an embodiment is described below), the contextual cryptographic fingerprint is used to prove the authentication of the user (and their presence at the same time). Several methods can be implemented to reach this goal of validation of the authentication. In general, these methods share the following features:
 the user identifies himself to the provider of goods and/or services (via a login/password pair, implicit or explicit authentication or by other means);
 the user carries out a selection of goods or of services that he wishes to acquire;
 the user carries out an action of payment, comprising in particular the providing of payment data (for example payment card data);
 the merchant server receives the payment data and initiates a payment transaction, the latter requiring an authentication to be obtained from a transaction server (bank server or server of the issuer);
 when the transaction server responds positively to the payment request transmitted by the merchant server, the transaction is validated and the payment carried out.

According to the present technique, these steps are modified and the contextual cryptographic fingerprint is used to prove the presence of the user, or even to validate the transaction itself. More particularly, the contextual cryptographic fingerprint is transmitted in addition to (or instead of) the payment data. The communication terminal transmits the contextual cryptographic fingerprint to the merchant server (the transmission method can be direct or indirect, as explained below). The merchant server receives this cryptographic fingerprint and transmits it to the authentication server (the authentication server can be the transaction server in the present case, although this is not required).

According to the embodiments, the method for transmitting the contextual cryptographic fingerprint can be direct or indirect. When the transmission is direct, the communication terminal transmits this contextual cryptographic fingerprint in a message to the merchant server. The merchant server thus comes into possession of the contextual cryptographic fingerprint via the communication terminal itself. This method has the advantage of limiting the interactions between the merchant server and for example the authentication server or another server. Insofar as the contextual cryptographic fingerprint of the communication terminal is (initially) received directly from the authentication server and stored in a secure manner on the communication terminal, it is reasonably estimated that said fingerprint cannot be compromised and that it preserves its value as a proof of authentication. When the transmission is indirect, the communication terminal transmits to the merchant server a link (for example a URL or a URI) linking to this contextual cryptographic fingerprint. The advantage is that the communication terminal does not possess the contextual cryptographic fingerprint. Even if the communication terminal is compromised, the contextual cryptographic fingerprint is secured in the authentication server. When the merchant server receives the link to the contextual cryptographic fingerprint (link that directs it to the authentication server (or the transaction server or other and/or to the blockchain)), it is possible for it to verify the validity of the contextual cryptographic fingerprint in the blockchain. Thus, this second possibility is advantageous when the blockchain is accessible to several identified players (for example such as the authentication server, the merchant server and/or the transaction server). The link (the reference) transmitted allows to access the blockchain, managed by the transaction server(s).

Regardless of the method used (direct or indirect), the merchant server (or the authentication server or the transaction server) verifies the validity of the contextual cryptographic fingerprint provided, in the blockchain, in particular by verifying whether the contextual cryptographic fingerprint provided is valid given the block into which it is inserted (first verification) and optionally whether the contextual cryptographic fingerprint provided is the latest contextual cryptographic fingerprint of the user (second verification). For the first verification, the server that carries out the verification obtains, from the contextual cryptographic fingerprint provided, data relative to the authentication: timestamp, emitter (for example identifier of the communication terminal), receiver (for example identifier of an authentication service), and a number of blocks having confirmed the contextual cryptographic fingerprint provided (number of validation blocks) and optionally other contextual information: IP address, geographic position, previous cryptographic fingerprint (of the user), etc. The server is capable, on the basis of this data, of verifying that they provide (after calculation) a fingerprint identical to the contextual cryptographic fingerprint provided.

For the second verification, the contextual cryptographic fingerprint is linked to a previous cryptographic fingerprint (i.e. either the previous contextual cryptographic fingerprint or the reference cryptographic fingerprint).

In a first alternative, distinct from or complementary to the second alternative, the various contextual cryptographic fingerprints of a user are chained to each other inside the blockchain, thus forming, as such, a chain inside the blockchain: the successive contextual cryptographic fingerprints are used to create a current contextual cryptographic fingerprint. More particularly, in this schema, the reference contextual cryptographic fingerprint is considered to be the fingerprint at the time t0 (i.e. upon the subscription of the user). The contextual cryptographic fingerprint calculated at the time t1 (t1>t0), during the authentication of the user, takes into account the reference cryptographic fingerprint (for example by being integrated (as a piece of constituting data) into the calculation of the contextual cryptographic fingerprint calculated at the time t1). The contextual cryptographic fingerprint calculated at the time t2(t2>t1>t0), during the authentication of the user, takes into account the previous cryptographic fingerprint (for example by integrating the contextual cryptographic fingerprint calculated at the time t1) and so forth. In this case there is an additional security measure ensuring that an old contextual cryptographic fingerprint of a user cannot be reused. This chain is called chain of contextual cryptographic fingerprints. It is unitary and associated with a single user/communication terminal pair. It is representative of a timeline of successive authentications carried out by the user for their communication terminal and ensures that at a given time, a single contextual cryptographic fingerprint can be used to validate a transaction (i.e. the last one, in the sense latest contextual cryptographic fingerprint). Thus, it is very difficult (or even impossible) to attempt to reuse an old contextual cryptographic fingerprint of the user (by a replay attack for example).

In a second alternative, distinct from or complementary to the first, the contextual cryptographic fingerprint is systematically linked to the reference cryptographic fingerprint. More particularly, the contextual cryptographic fingerprint is calculated on the basis of the reference cryptographic fingerprint of the user. Thus, when it verifies the contextual cryptographic fingerprint, the verification unit (authentication server, merchant server, transaction server) is capable of also verifying the authenticity of the reference cryptographic fingerprint, using the subscription data in its possession.

5.2. Description of a First Embodiment

Figure 2:
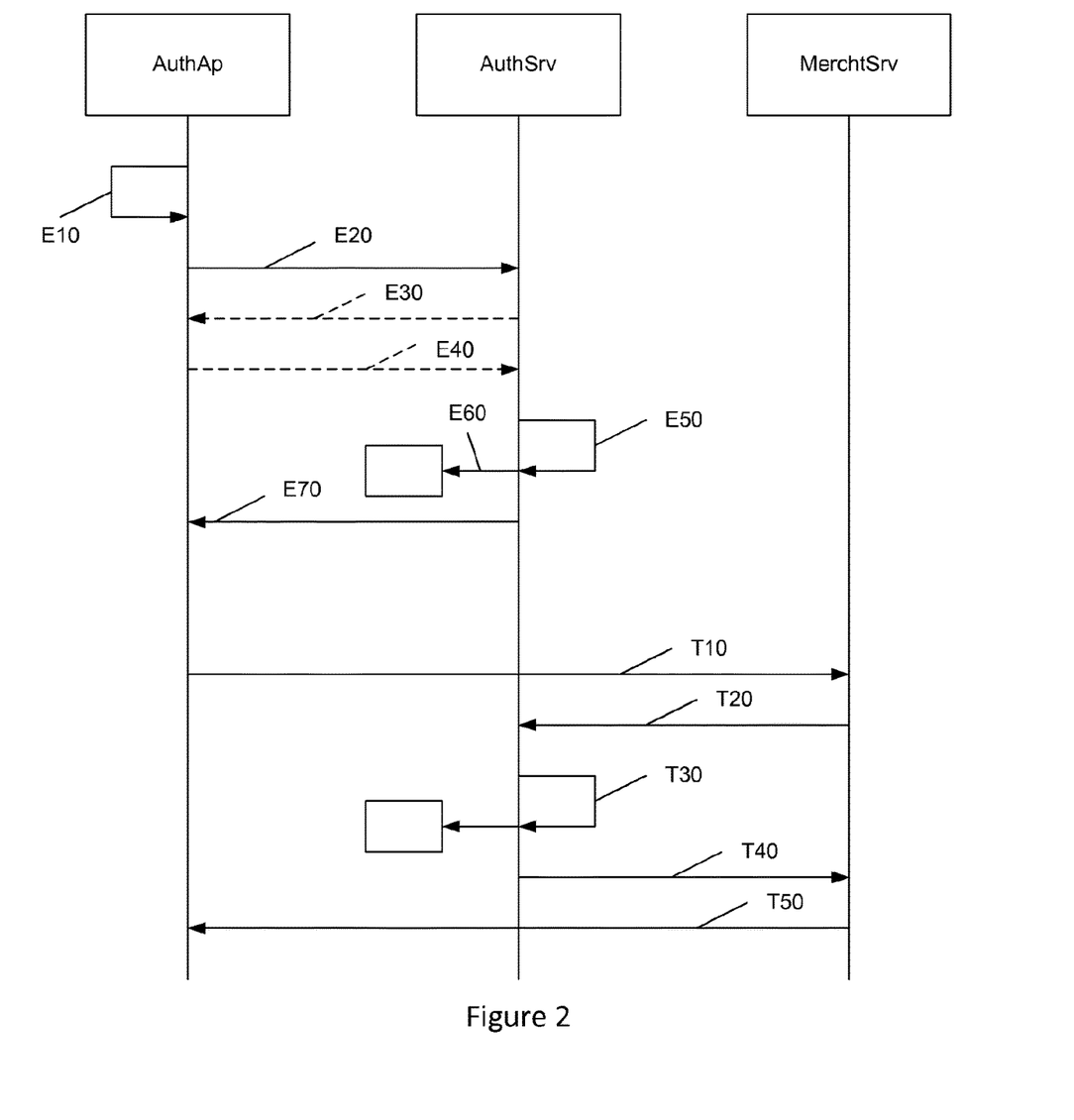
FIG. 2 describes an embodiment derived from the method for processing a transaction.

The first embodiment is explained in relation to FIG. 2. It comprises a first "authentication" phase and a second "transaction processing" phase.

The first authentication phase comprises:
- a step E10 of authenticating the user on their communication terminal or on the authentication server, this authentication step taking place between for example an authentication application (AuthAp) and the user; this step can be consecutive to an explicit authentication request or be implicit (commanded by the use of the communication terminal);
- a step E20 of transmitting, to the authentication server, an authentication message, comprising the confirmation of the authentication of the user and complementary data;
- optionally a step E30 of transmitting a request from the authentication server with a view to obtaining complementary data if the latter is not transmitted with the authentication message; and optionally, a step E40 of transmitting this complementary data;
- a step E50 of calculating a contextual cryptographic fingerprint using the data received from the communication terminal;
- a step E60 of inserting the contextual cryptographic fingerprint into the blockchain; and when the blockchain into which the contextual cryptographic fingerprint has been inserted is validated, a step E70 of transmitting the contextual cryptographic fingerprint to the communication terminal (according to one of the transmission modes described above, direct or indirect, via an address of location of the fingerprint in the blockchain).

Once this authentication phase has ended, the communication terminal has a contextual cryptographic fingerprint (or an address for it) and the authentication server also has this contextual cryptographic fingerprint. As indicated above, this authentication phase can be iterated several times before the communication terminal initiates the phase of transaction processing (in which case the communication terminal has the latest contextual cryptographic fingerprint, i.e. the last one created).

The second transaction processing phase comprises:
- a step T10 of transmission by the communication terminal of a request for transaction validation, comprising the contextual cryptographic fingerprint (or its reference), to the merchant server; this step can be consecutive to the validation of a shopping cart on the merchant site for example or be consecutive to the providing by the payment terminal of payment data to a transaction server (the merchant server thus being replaced by a transaction server);
- a step T20 of transmission by the merchant server (or the transaction server) of the contextual cryptographic fingerprint to the authentication server;
- a step T30 of verification of the validity of the contextual cryptographic fingerprint by the authentication server; and
- when the contextual cryptographic fingerprint is valid, a step T40 of transmitting to the merchant server (or to the transaction server) a message of validation of the contextual cryptographic fingerprint;
- a step T50 of transmitting, to the communication terminal, a message of transaction validation.

Thus, in this embodiment, the contextual cryptographic fingerprint is used to prove the authentication of the user (and their "recent" presence at the same time). The communication terminal transmits the contextual cryptographic fingerprint to the merchant server which uses it to verify its validity with the authentication server.

The step T30 of verifying the validity of the contextual cryptographic fingerprint can be limited to noting the validity of the block in which the contextual cryptographic fingerprint is recorded and thus be based on the trusted nature of the blockchain, without another more complex form of verification. This verification can also comprise the calculation, using the data transmitted by the communication terminal (in addition to the contextual cryptographic fingerprint), of a verification cryptographic fingerprint and the comparison of this verification cryptographic fingerprint to the contextual cryptographic fingerprint provided. Cleverly, the verification of the validity comprises a verification of the fact that the contextual cryptographic fingerprint is the latest for the user and/or the communication terminal. Moreover, the verification comprises the verification of the identity of at least one of the pieces of data used to create the contextual cryptographic fingerprint with a piece of data in the possession of the server that carries out this verification (for example such as a hash of a piece of bank card data and/or a hash of a piece of biometric data and/or a hash of a password and/or of a login). The effective implementation of this verification depends on the implementation operational conditions. When the verification is positive, the fingerprint is validated (i.e. that a piece of data, for example a piece of Boolean data, validates the authenticity of the fingerprint (and/or of the block into which it is inserted)).

5.3. Description of a Second Embodiment

Figure 3:
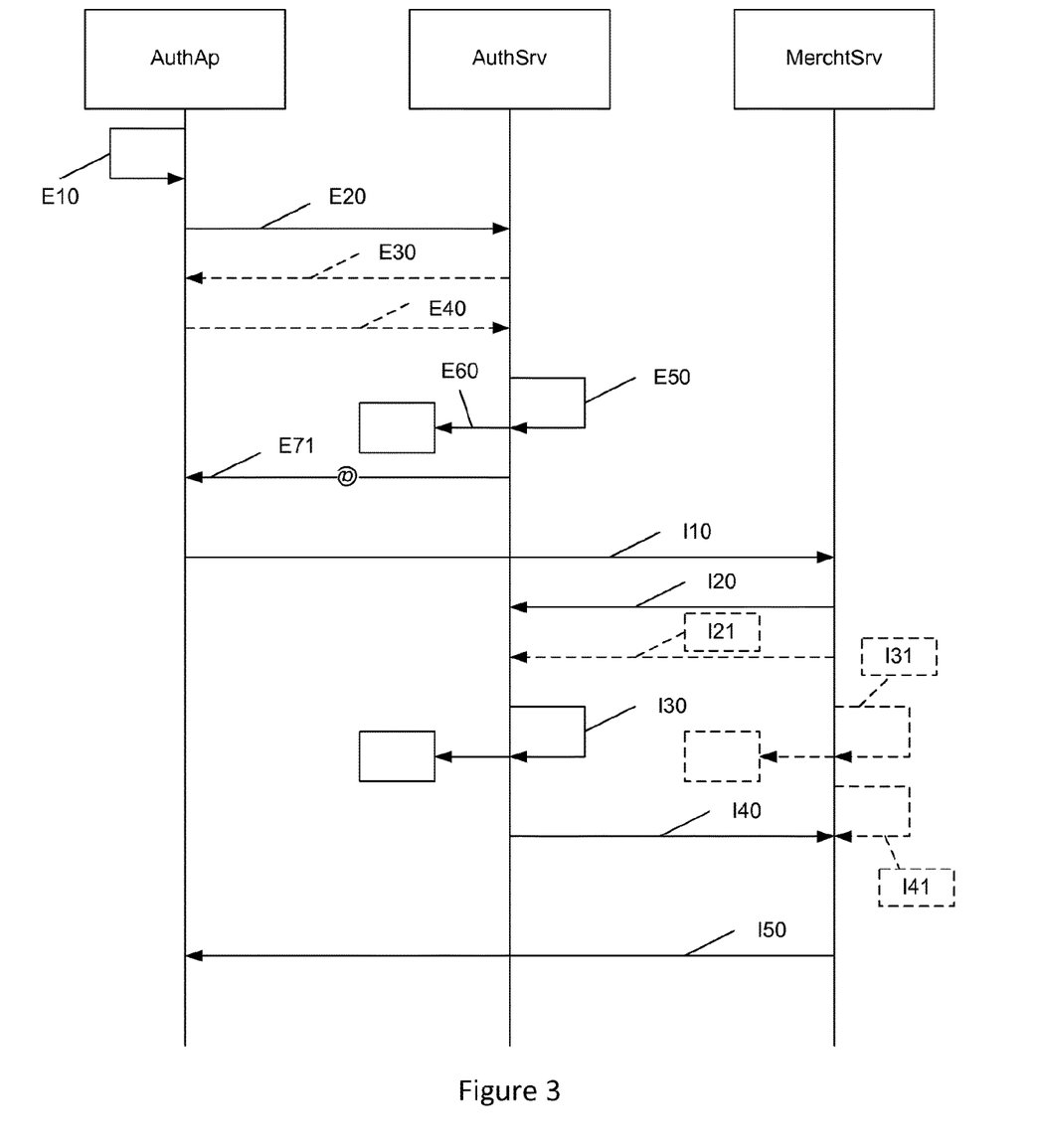
FIG. 3 describes an embodiment derived from the method for processing a transaction.

In this second embodiment, the blockchain is shared with the merchant servers (either directly or via a transaction server). The authentication phase is identical to that described in relation to FIG. 2 and will not be described again (the only difference being the reception E71, by the communication terminal, of an address (@) at which the contextual cryptographic fingerprint is located (rather than its direct transmission). Thus, the transaction processing phase, described in relation to FIG. 3, thus comprises:

- a step I10 of transmission by the communication terminal of a request for transaction validation, comprising the address of the contextual cryptographic fingerprint, to the merchant server;
- a step I20 of transmission, by the merchant server, to a transaction server, of the address of the contextual cryptographic fingerprint; or
  - a step I21 of access, by the merchant server, to the address of the blockchain comprising the contextual cryptographic fingerprint;
- a step I30 of verification of the validity of the contextual cryptographic fingerprint by the transaction server; or
  - a step I31 of verification of the validity of the contextual cryptographic fingerprint by the merchant server;
- when the contextual cryptographic fingerprint is valid, a step I40 of transmission by the transaction server, to the merchant server, of a message of validation of the contextual cryptographic fingerprint, if the transaction server is cut off from the merchant server (otherwise, a step I41 of verification by the merchant server itself);
- a step I50 of transmitting, to the communication terminal, a message of transaction validation.

Thus, in this embodiment, the contextual cryptographic fingerprint is used to prove the authentication of the user, in an indirect manner, without involving the authentication server, which preserves the single function of authentication of the users on their terminals. The communication terminal transmits the address of the contextual cryptographic fingerprint to the merchant server which uses it to verify its validity (either directly or via the transaction server). This embodiment has the advantage of not making the contextual cryptographic fingerprint available to the communication terminal, thus increasing the security (since the risk of theft of this contextual cryptographic fingerprint is reduced).

The step of verifying the validity of the contextual cryptographic fingerprint is the same as for the first embodiment and can be unique or multiple, according to the chaining or not of this contextual cryptographic fingerprint with a previous cryptographic fingerprint (reference or contextual).

5.4. Device for Implementing the Invention

Figure 4:
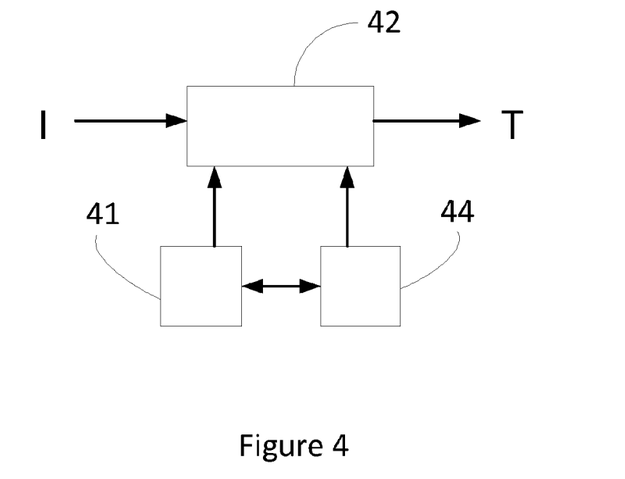
FIG. 4 illustrates an architecture of a server capable of implementing a method for processing a transaction.

In relation to FIG. 4, a simplified architecture of an authentication server capable of generating contextual fingerprints in conjunction with mobile devices is presented. An authentication server comprises a memory 41, a processing unit 42, equipped for example with a microprocessor, and controlled by the computer program 43, implementing the method as described above. In at least one embodiment, the invention is implemented in the form of an application installed on a server. Such a server comprises:

- means for obtaining a contextual cryptographic fingerprint, previously generated during an authentication of a user on a communication terminal;
- means for verifying the validity of the contextual cryptographic fingerprint in a blockchain comprising a set of cryptographic fingerprints;
- means for validating a transaction when the means for verifying the validity of the contextual cryptographic fingerprint in the blockchain provide a positive result.

Figure 5:
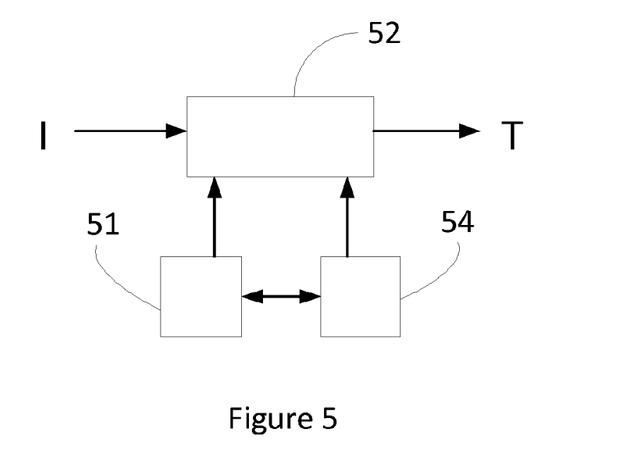
FIG. 5 illustrates an architecture of a client capable of implementing a method for processing a transaction.

In relation to FIG. 5, a simplified architecture of a mobile device capable of carrying out transactions using a contextual fingerprint is presented. Such a mobile device comprises a memory 51, a processing unit 52 equipped for example with a microprocessor, and controlled by the computer program 53, implementing the method according to the invention. In at least one embodiment, the invention is implemented in the form of a mobile application installed on a mobile device in the possession of the user. Such a mobile device comprises:

- means for generating a contextual or reference cryptographic fingerprint;
- means for transmitting said cryptographic fingerprint and/or data for constituting this fingerprint to an authentication server;
- means for carrying out a payment transaction on a merchant server, comprising the implementation of the means for transmitting a contextual cryptographic fingerprint and/or a link to a contextual cryptographic fingerprint;
- means for receiving a piece of data representative of the validation of the transaction by said server.

These means are in the form of a specific software application, or in the form of dedicated hardware components, such as a securing element (SE) or a secure execution environment. The securing element can be in the form of a SIM card, USim, UICC, or a specific security component, grafted onto the motherboard of the communication terminal. More particularly, in at least one embodiment, these means are in the form of several hardware components to which several software components are added. More particularly, the emission means are for example comprised in a secure component that comprises for example more or less direct access to an emission/reception controller, allowing to directly interrogate a server. This secure component is in charge of the at least partial determination of a parameter of calculation of the certification code. The other components of the communication terminal were described in relation to the embodiment proposed.

The invention claimed is:

1. A method for processing a payment transaction, the method being implemented by an electronic device for processing payment transactions, accessible via a communication network, said method comprising a payment transaction processing phase which comprises:
   - obtaining a contextual cryptographic fingerprint, previously generated during an authentication of a user on a communication terminal;
   - verifying validity of the contextual cryptographic fingerprint in a blockchain comprising a set of cryptographic fingerprints,
   - verifying that the contextual cryptographic fingerprint is the latest contextual cryptographic fingerprint for said user and/or said communication terminal, in the blockchain; and
   - validating a payment transaction in response to the verifying the validity of the contextual cryptographic fingerprint in the blockchain and the verifying that the contextual cryptographic fingerprint is the latest contextual cryptographic fingerprint for said user and/or said communication terminal, in the blockchain, being both positive.

2. The method for processing a payment transaction according to claim 1, wherein the contextual cryptographic fingerprint (EC), of the set of cryptographic fingerprints, is embodied by an identification string ChIEC for identification of the cryptographic fingerprint EC which is obtained on the basis of a set D of constituent data (d0, ... ,dn) in the following manner:

$$ChIEC = F(G(d0, \ldots, dn))$$

wherein:

G is a data-mixing function;

F is a cryptographic function for calculating the identification string.

3. The method for processing a payment transaction according to claim 1, wherein the obtaining the contextual cryptographic fingerprint comprises:
receiving an address of location of the contextual cryptographic fingerprint in the blockchain;
obtaining the contextual cryptographic fingerprint at the address previously received.

4. The method for processing a payment transaction according to claim 1, wherein the verifying the validity of the contextual cryptographic fingerprint comprises verifying the validity of a block of the blockchain into which the contextual cryptographic fingerprint is inserted.

5. The method for processing a payment transaction according to claim 1, wherein the verifying the validity of the contextual cryptographic fingerprint comprises:
obtaining payment transaction data, coming from the communication terminal;
calculating, on the basis of this payment transaction data, a verification cryptographic fingerprint;
comparing the verification cryptographic fingerprint to the contextual cryptographic fingerprint; and
validating the contextual cryptographic fingerprint in response to the comparison being positive.

6. The method for processing a payment transaction according to claim 1, wherein the verifying the validity of the contextual cryptographic fingerprint comprises a step of comparing at least one piece of data for constituting the contextual cryptographic fingerprint to at least one corresponding piece of data provided by the communication terminal.

7. The method for processing a payment transaction according to claim 1, wherein the method further comprises a preliminary authentication phase, during which the contextual cryptographic fingerprint is created, said preliminary authentication phase comprising:
authenticating the user;
obtaining an authentication message, comprising confirmation of the authentication of the user and a set D of constituent data (d0, ... ,dn);
calculating the contextual cryptographic fingerprint using the data received.

8. The method for processing a payment transaction according to claim 7, wherein the preliminary authentication phase further comprises:
inserting the contextual cryptographic fingerprint into the blockchain; and
in response to the block of the blockchain into which the contextual cryptographic fingerprint has been inserted being validated, transmitting the contextual cryptographic fingerprint to the communication terminal.

9. An electronic device for processing payment transactions, accessible via a communication network, said device comprising:
at least one processor; and
at least one non-transitory computer-readable medium comprising instructions stored thereon which when executed by the at least one processor configure the electronic device to process a payment transaction and:
obtain a contextual cryptographic fingerprint, previously generated during an authentication of a user on a communication terminal;
verify validity of the contextual cryptographic fingerprint in a blockchain comprising a set of cryptographic fingerprints,
verify that the contextual cryptographic fingerprint is the latest contextual cryptographic fingerprint for said user and/or said communication terminal, in the blockchain; and
validate a payment transaction implemented in response to the verifying the validity of the contextual cryptographic fingerprint in the blockchain and the verifying that the contextual cryptographic fingerprint is the latest contextual cryptographic fingerprint for said user and/or said communication terminal, in the blockchain, being both positive.

10. A non-transitory computer-readable medium comprising a computer program product thereon, which comprises program code instructions for executing a method, when the instructions are executed by a processor of an electronic device, wherein the instructions configure the electronic device to process a payment transaction and:
obtain a contextual cryptographic fingerprint, previously generated during an authentication of a user on a communication terminal;
verify validity of the contextual cryptographic fingerprint in a blockchain comprising a set of cryptographic fingerprints,
verify that the contextual cryptographic fingerprint is the latest contextual cryptographic fingerprint for said user and/or said communication terminal, in the blockchain; and
validate a payment transaction implemented in response to the verifying the validity of the contextual cryptographic fingerprint in the blockchain and the verifying that the contextual cryptographic fingerprint is the latest contextual cryptographic fingerprint for said user and/or said communication terminal, in the blockchain. being both positive.

* * * * *